July 27, 1954   A. L. STOECKEL   2,684,694
MACHINE FOR MAKING WIRE FABRIC
Original Filed March 31, 1949   10 Sheets-Sheet 1

INVENTOR
Albert L. Stoeckel

July 27, 1954  A. L. STOECKEL  2,684,694
MACHINE FOR MAKING WIRE FABRIC
Original Filed March 31, 1949  10 Sheets-Sheet 4

Fig. 3.

INVENTOR
Albert L. Stoeckel
By his attorneys
Hoopes, Leonard & Glenn

July 27, 1954  A. L. STOECKEL  2,684,694
MACHINE FOR MAKING WIRE FABRIC
Original Filed March 31, 1949  10 Sheets-Sheet 5

Fig. 4.

INVENTOR
Albert L. Stoeckel
By his attorneys
Hoopes, Leonard & Glenn

July 27, 1954     A. L. STOECKEL     2,684,694
MACHINE FOR MAKING WIRE FABRIC
Original Filed March 31, 1949     10 Sheets-Sheet 9

INVENTOR
Albert L. Stoeckel

July 27, 1954  A. L. STOECKEL  2,684,694
MACHINE FOR MAKING WIRE FABRIC
Original Filed March 31, 1949  10 Sheets-Sheet 10

INVENTOR
Albert L. Stoeckel

Patented July 27, 1954

2,684,694

UNITED STATES PATENT OFFICE 2,684,694

MACHINE FOR MAKING WIRE FABRIC

Albert L. Stoeckel, Euclid, Ohio, assignor to Wean Equipment Corporation, Euclid, Ohio, a corporation of Ohio Original application March 31, 1949, Serial No. 84,533, now Patent No. 2,642,098, dated June 16, 1953. Divided and this application March 29, 1950, Serial No. 152,559

4 Claims. (Cl. 140—6)

This invention relates to a machine for making wire fabric and to improvements in such a machine facilitating its operation and whereby an improved and more uniform product may be produced. Certain of the improvements are adaptable for use in wire working machines generally. This application is a division of my copending application Serial No. 84,533, filed March 31, 1949, now Patent No. 2,642,098, issued June 16, 1953.

For purposes of explanation and illustration I have shown the invention as embodied in a machine for making hexagonal mesh wire fabric out of strands of wire which are fed to the machine in generally side-by-side relationship and twisted together at intervals in a manner known in the art. In the machine shown series of twisters are provided and certain adjacent wires are twisted together by one series of twisters and other adjacent wires are twisted together by the succeeding series of twisters to produce the wire fabric. The wires are guided into the twisters by guides disposed adjacent the twisters. Since the effective length of a wire is shortened by twisting it with another wire provision is made for providing slack in the wires, which slack is taken up by the twisting of the wires together.

I provide improved means for forming slack in the wires. I provide, in a machine for making wire fabric having series of twisters to which wires arranged in generally side-by-side relationship are fed to twist wires together and make wire fabric, guides for directing the wires into the twisters and means for forming slack in the wires to provide for twisting, said means being interrupted at spaced points therealong to provide passageways for line wires which are not twisted so that no slack is formed in the line wires. The line wires may be selvage wires at the edges of wire fabric being made on the machine. A selvage wire is twisted about an adjacent wire only by twisters of alternate series, the line wire extending straight in the direction of the length of the fabric between twists. Hence the line wire should not have slack formed in it at those series of twisters where it is not to be twisted. My improved slack forming means makes provision for the straight passage of line wires between twists effected by alternate series of twisters.

The slack forming means engage the wires intermediate the series of twisters to draw slack therein before the wires are twisted by an adjacent twister and are shaped to provide wire receiving recesses at spaced points therealong to provide passageways for line wires which are not twisted so that no slack is formed in the line wires. Every roll of fabric has straight selvage wires at its edges; straight line wires may also be incorporated in the fabric at desired locations transversely of the fabric.

I preferably employ a drum carrying at equally spaced intervals about its periphery and each disposed in a radial plane projections whose outer extremities are parallel with the axis of the drum for engaging the wires intermediate the series of twisters to draw slack therein to provide for twisting.

The slack forming means may be sectional, the sections thereof being disposed end to end but having adjacent ends spaced apart to form passageways for line wires which are not twisted so that no slack is formed in the line wires.

I desirably provide a rotatable shaft disposed generally parallel to the series of twisters and sleeve means carried by the shaft and rotatable therewith and having projections for engaging the wires intermediate the series of twisters to draw slack therein to provide for twisting.

When a rotatable drum is provided for the slack drawing means the drum preferably has in its surface longitudinal slots equally spaced circumferentially thereof and slack drawing members in the slots for engaging the wires intermediate the series of twisters.

The slack drawing means may be in the form of blades disposed in slots in a carrying device such as a rotatable drum and projecting radially outwardly therefrom for engaging the wires intermediate the series of twisters; the blades may be held in place by fastening devices disposed intermediate the blades. Each fastening device may be in holding engagement with the blades on both sides thereof.

In a wire fabric making machine the order in which the wires which are to be twisted together enter each twister should be uniform in order that the resultant fabric may be flat and of uniform and regular appearance. In some machines for making hexagonal wire fabric alternate rows of twisters turn in opposite directions to effect the twisting of the wires. In the machine herein shown all of the twisters turn in the same direction to effect the twisting of the wires. For uniformity throughout the fabric a predeterminedly oriented wire should enter each twister first. I provide extremely simple yet highly effective means for insuring entry of the wires into each twister in the desired order.

I provide, in a machine for making wire fabric having series of twisters to which wires arranged in generally side-by-side relationship are fed to twist wires together and make wire fabric and guides for directing the wires into the twisters, wire delaying means at one side of a twister to delay entry into the twister of one of the wires entering the twister to insure entry of another wire ahead of said wire. The twisters herein disclosed are throated twisters and the guides are disposed adjacent the sides of the twister throats. The wire delaying means may be disposed at one side of a twister throat to delay entry thereinto of a wire directed into the twister throat by one guide to insure entry into the twister throat ahead of said wire of a wire directed into the twister throat by the opposite guide. I may provide means disposed in the path of a wire directed into the twister throat by one of the guides to momentarily delay entry of that wire into the twister throat.

The wire delaying means may be integral with the twisters. I desirably provide means forming part of a twister disposed in the path of a wire directed into the twister throat by one of the guides to momentarily delay entry of that wire into the twister throat to insure entry into the twister throat ahead of said wire of a wire directed into the twister throat by the opposite guide.

I may form the throats of the twisters relatively open at one side and relatively restricted at the opposite side so that a wire directed into the throat of such a twister by a guide at the first mentioned side of the throat will move down into the throat ahead of a wire directed into the twister throat by the opposite guide.

The twisters may be in the form of gears which are operated by racks movable generally parallel to the series or rows of twisters. Each twister gear may have integral therewith at one side of its throat wire delaying means for the purpose above explained.

I preferably provide means disposed in the paths of wires directed into the throat of a twister at each side thereof, said means at one side of the throat comprising a surface extending more transveresly of the throat than said means at the other side of the throat to insure entry into the throat of a wire directed thereinto along the second mentioned side of the throat in advance of a wire directed thereinto simultaneously along the first mentioned side of the throat. The inner portion of each twister throat may have a transverse dimension less than twice the diameter of the wire to be twisted but the entrance to the throat may have a transverse dimension greater than twice the diameter of the wire to be twisted, the entrance to the throat being tapered from relatively great transverse dimension to relatively small transverse dimension inwardly of the throat, the taper at one side of the entrance being greater than that at the opposite side of the entrance.

The wires employed in making wire fabric in a machine of the type above referred to are fed to the machine from coils disposed adjacent the machine. For a wide machine many coils of wire are employed. For example, a machine capable of producing wire fabric up to eighty-one inches wide may employ as many as 156 different wires each of which is pulled from a coil of wire. With a large number of coils it is of course necessary that some of them be disposed relatively remote from the machine and that means be provided for guiding each wire to its proper place in the machine. The consequence of this is that greater pull is required to feed certain wires to the machine than is required to feed other wires. It is important that the wires be fed to the twisters under uniform tension conditions and that each wire move to the twisting mechanism at a speed properly correlated to the speed at which it is drawn forward in the twisting mechanism.

To accomplish feeding of the wires to the twisting mechanism in the manner above mentioned it has heretofore been proposed to employ a device capable of feeding the wires slightly faster than they are taken by the twisting mechanism, the intention being that slippage will occur between the feeding device and the wires when there is a tendency to feed them faster than they are taken by the twisting mechanism. Such mechanism has not, however, been fully satisfactory and overfeeding of the wires to the twister mechanism has occurred, resulting in irregularities in the material and occasional tangling of the wires in the machine.

I provide means for preventing overfeeding of the wires to the twisting mechanism. I provide, in a machine for making wire fabric having twisting means to which wires arranged in generally side-by-side relationship are fed to twist wires together and make wire fabric and means for pulling wire from a source of wire and feeding it to the twisting means, an overfeed preventer disposed between the pulling and feeding means and the twisting means engaging the wire to insure against feeding thereof by the pulling and feeding means when the wire tends to feed to the twisting means faster than the wire is taken by the twisting means. The pulling and feeding means are preferably constantly driven during operation of the machine and the overfeed preventer preferably engages the wire to cause the wire to remain stationary or be fed to the twisting means at a speed less than the speed at which the constantly driven pulling and feeding means tends to feed the same when the pulling and feeding means tends to feed the wire to the twisting means faster than the wire is taken by the twisting means.

The overfeed preventer may exert back tension on the wire to inhibit feeding of the wire to the means for acting on it faster than the wire is taken by such means.

The means for acting on the wire and the means for advancing the wire from a source of wire to the first mentioned means may both be positively driven at relative speeds such that the wire advancing means tends to advance wire to the first mentioned means at a speed slightly greater than the speed at which the first mentioned means takes the wire, the overfeed preventer being disposed between the wire advancing means and the first mentioned means exerting back tension on the wire to cause slight slippage between the wire and the advancing means so that the advancing means insures feeding of wire to the first mentioned means to at all times meet the demands of the first mentioned means but without the formation of slack between the advancing means and the first mentioned means.

The advancing or feeding means may be a capstan wire feeder. The means for acting on the wire and the capstan may both be positively driven at relative speeds such that the capstan tends to feed wire to the first mentioned means at a speed slightly greater than the speed at which the first mentioned means takes the wire and the overfeed preventer may be disposed between the capstan and the first mentioned means and exert a drag on the wire so that slight slippage occurs between the wire and the capstan and the wire is at all times fed to the first mentioned means at approximately the speed of the first mentioned means without the formation of slack between the capstan and the first mentioned means. The overfeed preventer may be positioned at a point relatively close to the capstan and may frictionally engage the wire so that there will be no slack in the wire between the overfeed preventer and the means for acting on the wire and the tendency of the capstan to feed the wire at a speed greater than the speed at which the means for acting on the wire takes the wire is overcome by slight slippage between the wire and the capstan.

I provide for mounting the means for forming the slack in the wires so that such means may be moved toward and away from the series of twisters or means for acting on wires fed thereto in such manner that the relative positions of the means for acting on the wires and the slack forming means may be adjusted while maintaining predetermined relative orientation therebetween. A plurality of supports may be provided for the slack forming means and means may be employed for synchronously moving the supports to move the slack forming means toward and from the means for acting on the wires. I preferably employ a single control device and connections between the control device and the supports for synchronously moving the supports upon operation of the control device.

When the slack forming means is turnable it may be mounted in a pair of bearings spaced apart therealong, preferably adjacent the respective ends thereof, and a single control device may be employed for synchronously moving the bearings, through appropriate connections, relatively to the means for acting on the wires. A drive shaft may be provided for the slack forming means which is generally coaxial therewith and a flexible connection may be employed between the drive shaft and the slack forming means to permit turning of the slack forming means by the drive shaft when the slack forming means is in different positions relatively to the means for acting on the wires.

A shaft may extend generally along the slack forming means and connections may be employed between the shaft and the supports for the slack forming means whereby upon turning of the shaft the supports are moved synchronously toward or away from the means for acting on the wires whereby to adjust the relative positions of the slack forming means and the means for acting on the wires while maintaining predetermined relative orientation therebetween. Means may be provided at both ends of the shaft for turning the shaft.

I also provide means engaging a wire prior to entry thereof into a twister deflecting the wire from its normal path whereby to change the angle of entry of the wire into the twister and thus provide for entry into the twister of another wire ahead of said wire. Such means are of especial utility in insuring uniform twisting at the respective edges of a strip of wire fabric being made on the machine. For reasons which will be fully explained hereinafter means are provided which are operative at one edge only of a strip of wire fabric being made on the machine engaging a selvage wire prior to entry thereof into a twister deflecting the wire from its normal path whereby to change the angle of entry of the wire into the twister and thus provide for entry into the twister of another wire ahead of said selvage wire. Guide means may be provided for guiding the wires into the twisters arranged to act upon the wires so that at one edge of a strip of wire fabric being made on the machine a selvage wire enters a twister ahead of a mesh wire and at the opposite edge of the strip a mesh wire enters the twister ahead of a selvage wire.

Other details, objects and advantages of the invention will become apparent as the following description of certain present preferred embodiments thereof proceeds.

In the accompanying drawings I have shown certain present preferred embodiments of the invention, in which.

Figures 1A, 1B:
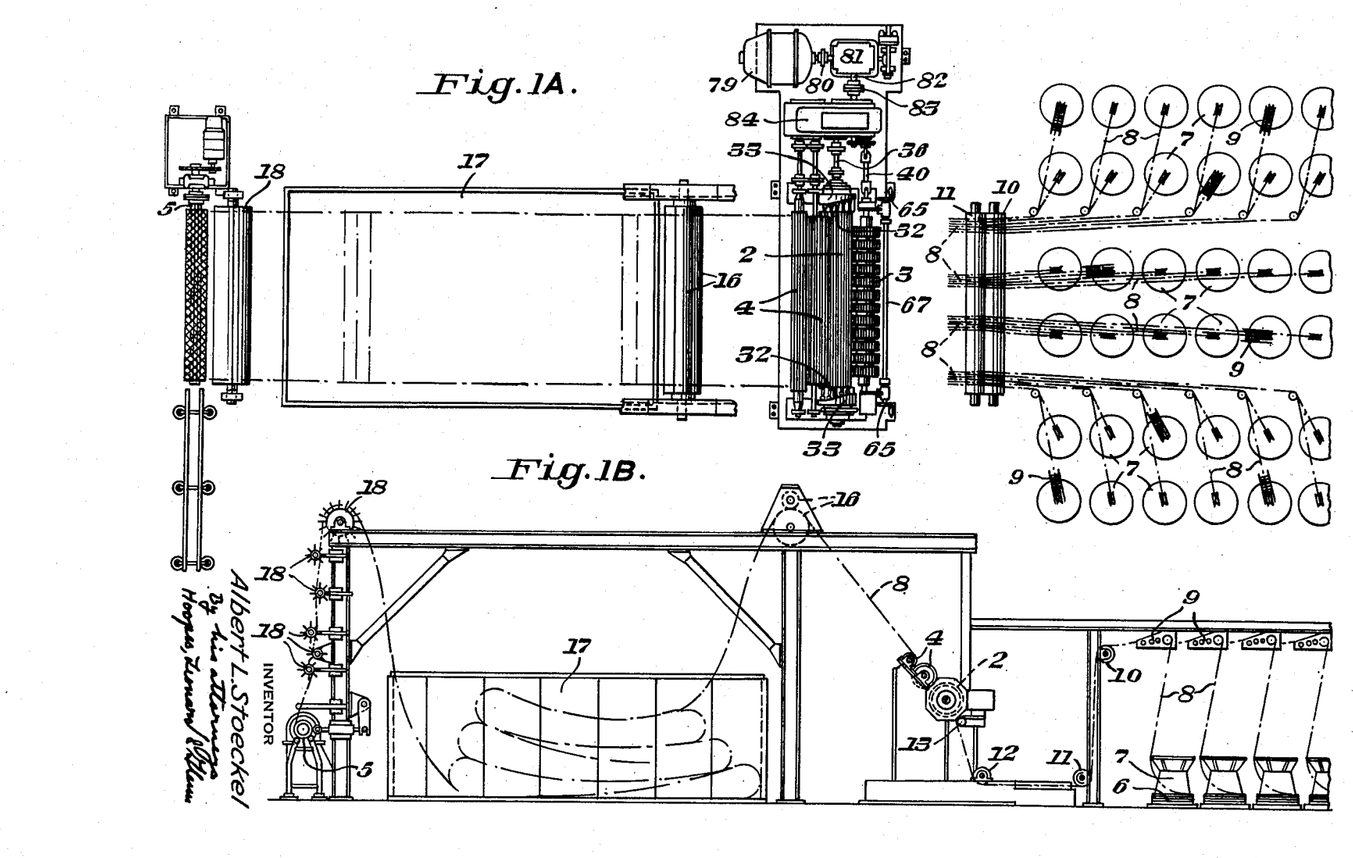
Figure 1A is a fragmentary diagrammatic plan view of a machine for making wire fabric.
Figure 1B is a fragmentary diagrammatic elevational view of the machine shown in Figure 1A.

Referring now more particularly to the drawings and initially to Figures 1A and 1B, there is shown a machine for making wire fabric having a twister drum 2 containing series of twisters in which wires which are fed to the drum are twisted together to make wire fabric, a feeder wheel 3, mechanism 4 for stripping the wire fabric from the drum 2 and a reel 5 upon which the fabric is wound up into a roll. The machine shown is one which is designed to make one-inch hexagonal mesh wire fabric (sometimes called "poultry netting" or "chicken wire") up to a maximum width of seventy-two inches. The width of the machine itself is greater than seventy-two inches to provide for making simultaneously a plurality of strips of fabric of an aggregate width of seventy-two inches with a space or spaces between adjacent strips. The machine may make a single strip of fabric seventy-two inches wide or a single strip narrower than seventy-two inches in width or it may take simultaneously a number of strips as above mentioned. When a single strip of fabric having a width of seventy-two inches is being made 144 mesh wires and four selvage wires (two selvage wires at each edge) are employed, making a total of 148 wires. When a single strip of fabric having a width of twenty-four inches is being made 48 mesh wires and four selvage wires (two selvage wires at each edge) are employed, making a total of 52 wires. When three twenty-four inch strips are made simultaneously three times 52 or 156 wires are employed. Each wire is disposed in a coil 6 on a swift 7 mounted on the floor adjacent the machine. The swifts are arranged in twenty-six rows of six swifts each. For lack of space only a few of the rows of swifts are shown in Figures 1A and 1B. For clarity some of the wires are omitted in Figure 1A but it is to be understood that when three 24-inch strips of wire fabric are being made simultaneously all 156 swifts are used.

The individual wires passing to the machine are designated by reference numeral 8. Each wire extends from its swift to a tension control device 9 disposed about the swift and thence about pulleys 10 and 11 to a capstan feeder 12. The capstan feeder 12 is driven in the clockwise direction viewing Figure 1B and each wire is disposed about it for at least one turn. Desirably the capstan feeder 12 has grooves, one for each wire, so that it not only feeds the wires forward but maintains them in proper relative position. The capstan feeder 12 has the characteristic that when a wire is drawn taut about it the feeder upon rotation advances the wire but when the wire is loose on the capstan the latter turns within the wire which does not advance.

From the capstan 12 the wires 8 pass about a pulley 13. The mesh wires pass directly from the pulley 13 to the twister drum 2 while certain of the line wires pass from the pulley 13 about pulleys 14 and 15 to the twister drum 2 (see Figures 4 and 6) for a reason which will be presently explained. The wires 8 are twisted together in the twister drum to form wire fabric. The fabric is stripped from the drum by the stripping mechanism 4 when it passes to overhead driven pinch rolls 16 which deliver the fabric into a well or looper 17 whence it is drawn over pulleys 18 and coiled upon the reel. When a coil of desired size has been formed upon the reel 5 the wire is cut, the coil is removed and a new coil is started. The provision of the looper allows for continuous operation of the machine for making the wire fabric despite intermittent operation of the reel due to periodic removal of coils therefrom.

The twister drum 2 has a number (forty-eight are shown) of longitudinal radial grooves 19 (see Figure 9) between which are disposed drilled and tapped holes 20 at suitable intervals for receiving fastening screws. In each groove 19 disposed against the opposite walls thereof are opposed plates 21 extending longitudinally of the twister drum. Each plate has an internal shoulder 22 and a series of external recesses 23 each tapering to maximum depth at an external shoulder 24. The plates 21 come together at their outer portions as shown at 25 and are formed with opposed circular recesses 26 (see Figure 8) in which twister gears 27 are journaled about their peripheries. A spacer 28 is disposed in each of the grooves 19 between the portions of the opposed plates 21 which are disposed below the internal shoulders 22 thereof whereby to properly and relatively position the plates 21. The plates 21 are held in place on the twister drum 2 by screws 29 cooperating with keeper plates 30. Each keeper plate 30 engages external shoulders 24 of the plate 21 at opposite sides thereof. The manner in which the plates 21 are assembled and held in place on the twister drum 2 is clearly shown in Figure 9.

Disposed within the space between the plates 21 of each cooperating pair of such plates outside the spacer 28 is a rack 31 which meshes with all of the twister gears 27 journaled in that pair of plates 21. Each rack is mounted for movement longitudinally of the twister drum and upon longitudinal movement turns all of the twisters of one series of twisters to twist wires disposed in the throats of the twisters. Each rack 31 carries at each end a follower roller 32 which follows a stationary circular cam 33, there being two complementary cams 33 at the respective ends of the machine. As the twister drum 2 turns the racks 31 are being continually moved back and forth parallel to the axis of the drum by the stationary cams 33. The cams 33 are bolted to the frame 34 by bolts 35. The twister drum 2 is driven by a shaft 36.

As above stated all of the twisters of the machine herein disclosed turn in the same direction to twist the wires disposed therein. Two wires pass into the throat of each twister whereupon the twister is turned, which occurs by longitudinal movement of the rack in mesh therewith due to turning of the twister drum. Each twister may turn through a desired number of revolutions, for example, three, to twist the wires disposed in its throat whereupon the twisted wires may be drawn from the twister throat and the twister may turn back to its original position ready to receive two more wires to repeat the cycle. Each twister completes a cycle of movements in a revolution of the twister drum 2.

Figure 8:
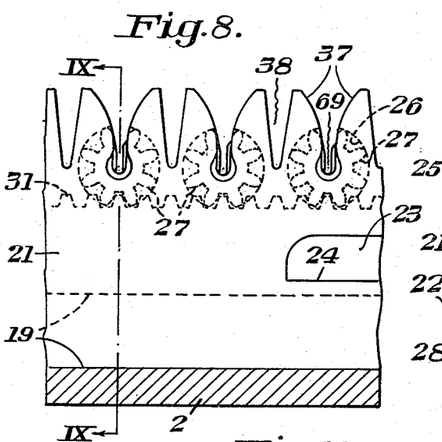
Figure 8 is a further enlarged fragmentary elevational view of a portion of the twister drum.
Figure 9:
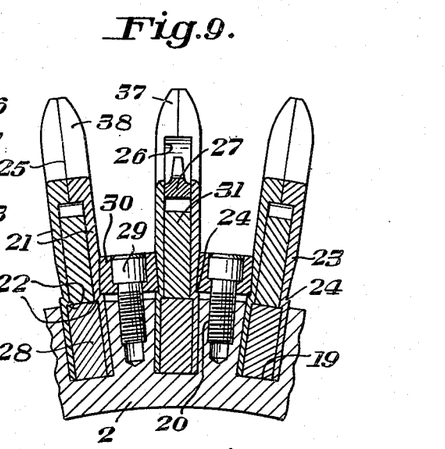
Figure 9 is a fragmentary cross-sectional view taken on the line IX—IX of Figure 8.
Figures 10, 11, 12, 13:
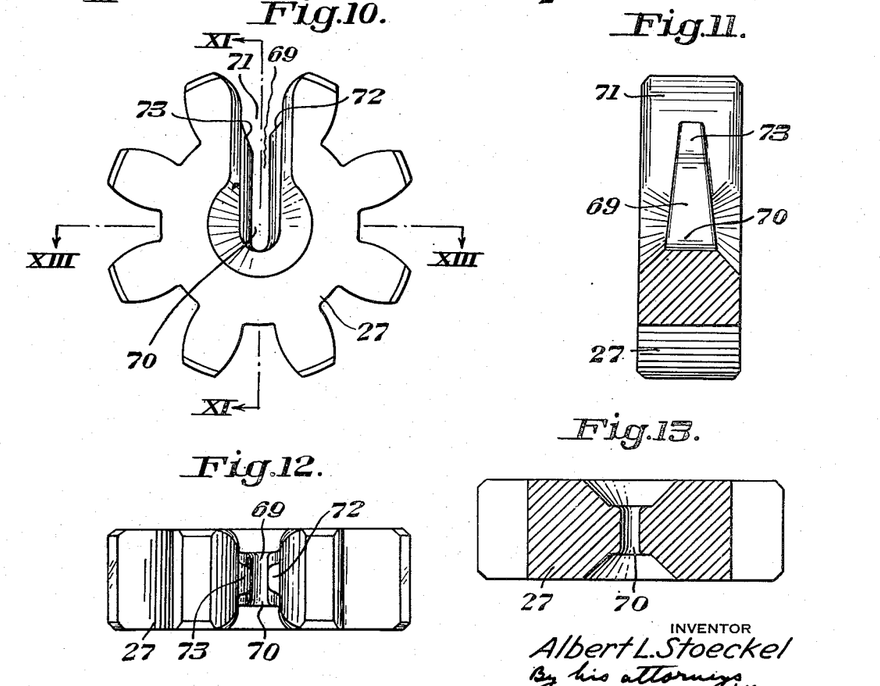
Figure 10 is a greatly enlarged face view of a twister gear.
Figure 11 is a cross-sectional view taken on the line XI—XI of Figure 10.
Figure 12 is a top plan view of the twister gear shown in Figure 10.
Figure 13 is a cross-sectional view taken on the line XIII—XIII of Figure 10.

The outer edges of the plates 21 are serrated as shown in Figure 8. The serrations provide curved guides 37 adjacent each twister so as to guide into the twister throat wires delivered thereto. Intermediate the twisters carried thereby the plates 21 have slots 38 for line wires such as selvage wires which pass straight along the fabric and are twisted only by twisters of alternate series. The twisters of successive series are staggered, i. e., those of the second series are disposed opposite the slots 38 which are midway between the twisters of the first series while the twisters of the third, fifth, seventh, et cetera, series are arranged in circumferential alignment with those of the first series and the twisters of the fourth, sixth, eighth, et cetera, series are in circumferential alignment with those of the second series.

Each of the guides 37 is curved so that at its outer extremity it is disposed to guide a predeterminedly positioned wire into its twister while a similar guide for an adjacent twister of the next series will guide the same wire into its twister. Hence the guides 37 guide the wires into a twister of each series of twisters as the twister drum rotates, each wire being moved laterally from a twister of one series to that of the next series and then back again to its original line. But since the two wires in each twister are twisted together the result is the fabrication of wire fabric of generally hexagonal structure as well known in the art.

Figure 5:
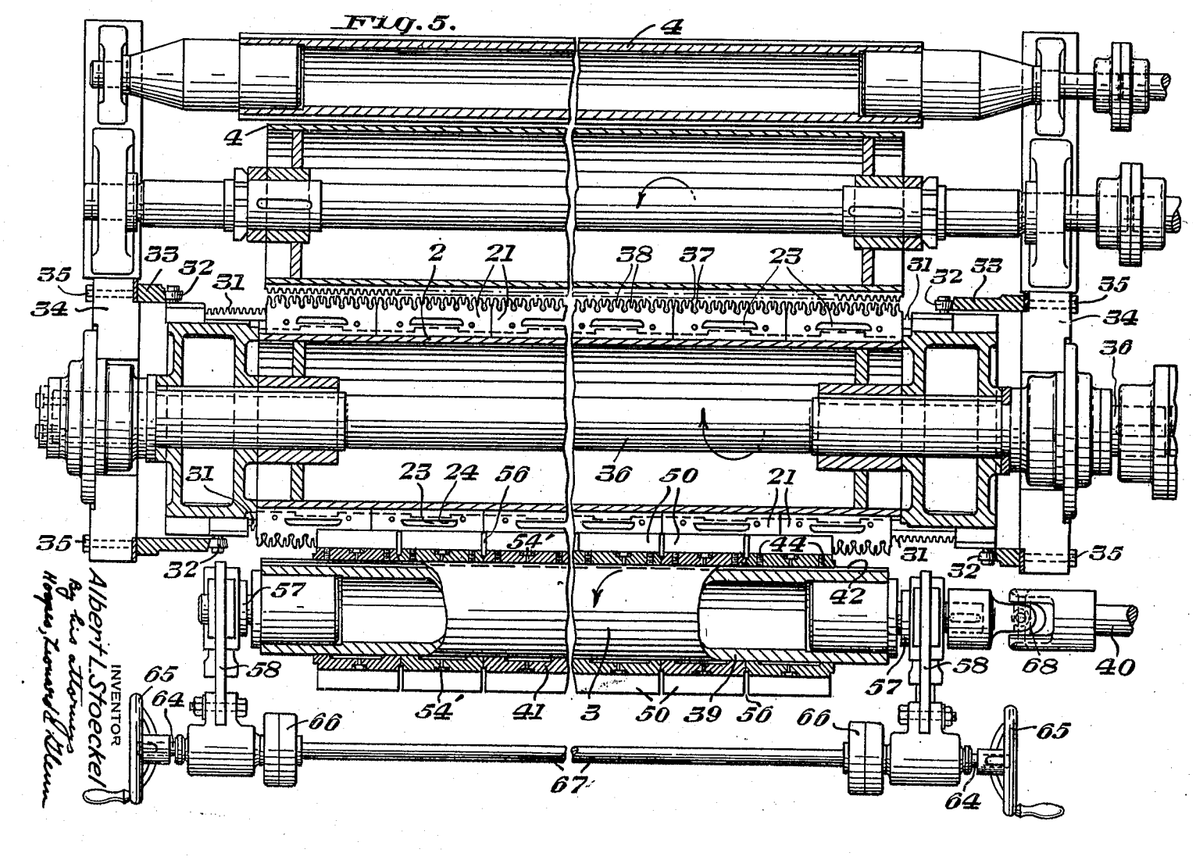
Figure 5 is a fragmentary cross-sectional view through the machine taken on the line V—V of Figure 4.

The plates 21 may extend the complete length of the twister drum or they may be in sections as shown in Figure 5. If they are in sections the sections abut end to end and form in effect a continuous plate extending from end to end of the twister drum.

Slack is formed in the wires to provide for formation of the twists by the feeder wheel 3. The feeder wheel 3 comprises a hollow shaft 39 driven by shaft 40 and onto which are slid sleeves 41 arranged in coaxial abutting relationship. The shaft 39 has a key 42 and each sleeve 41 has a keyway 43 receiving the key 42 whereby the sleeve is held against rotation relatively to the shaft. When the sleeves 41 are properly positioned on the shaft 39 they are maintained in place by set screws 44 threaded into drilled and tapped holes 45 in the sleeves and whose inner ends intersect the keyway 43.

Figure 14:
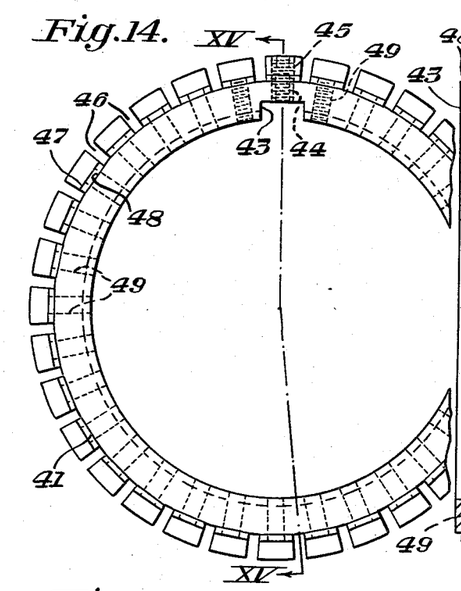
Figure 14 is an end elevational view of one of a series of sleeves in which are mounted the blades for feeding the wires into the twisters.
Figure 15:
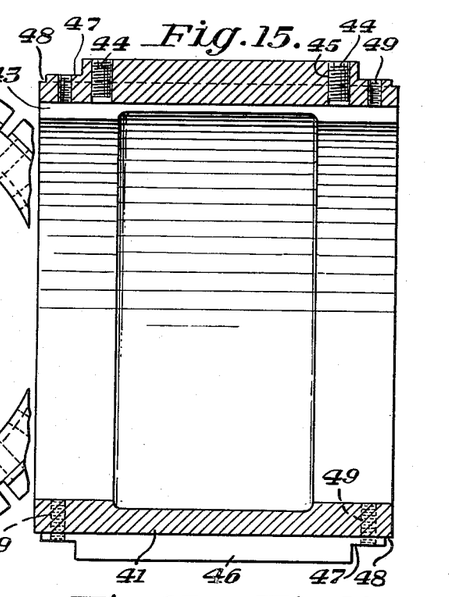
Figure 15 is a cross-sectional view taken on the line XV—XV of Figure 14.
Figure 16:
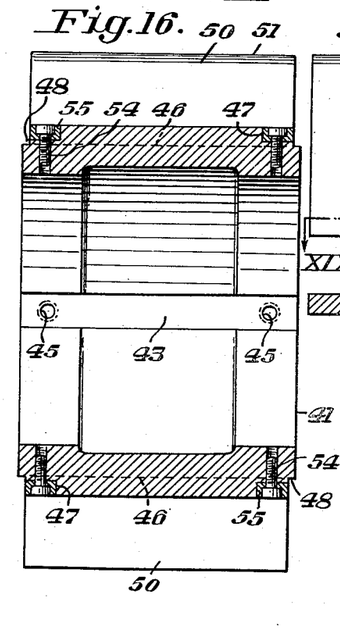
Figure 16 is a cross-sectional view showing one of the sleeves with the feeding blades in place therein.
Figures 17, 18, 19:
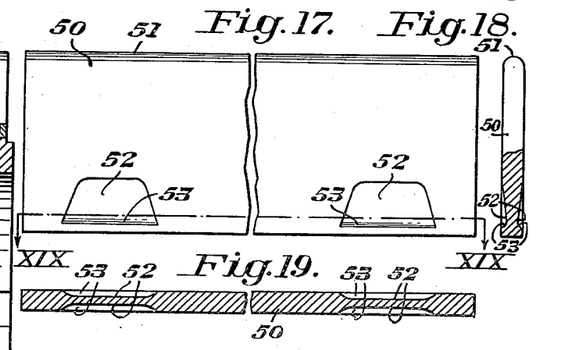
Figure 17 is a face view of one of the feeding blades.
Figure 18 is an end view of the blade shown in Figure 17, partly in cross-section.
Figure 19 is a cross-sectional view taken on the line XIX—XIX of Figure 17.
Figure 20:
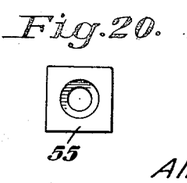
Figure 20 is a face view of a keeper plate.
Figure 21:
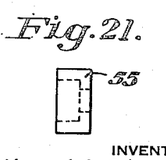
Figure 21 is an edge view of the keeper plate shown in Figure 20.

Each sleeve has a number of radial grooves 46, thirty-two grooves being shown in Figure 14. Each sleeve 41 has a relatively large circumferential recess 47 and a relatively small circumferential recess 48 cut out of it adjacent each face to provide for a stepped contour as shown in Figure 15. Drilled and tapped holes 49 are formed in each sleeve at the respective recesses 47, each sleeve having two circumferential series of holes 49, the respective holes being disposed midway between the grooves 46.

Disposed in each groove 46 is a feeder blade 50 generally in the form of a plate having in each face adjacent each end a tapered recess 52 terminating in an external shoulder 53. When the blades 50 are in place in the recesses 46 screws 54 are screwed into the holes 49, each screw passing through a keeper 55 which engages the shoulders 53 of the feeder blades at opposite sides thereof whereby the feeder blades are maintained in place with respect to the sleeves. The blades, however, are shorter than the sleeves, the length of each blade being equal to the length of the sleeve carrying it less the sum of the axial dimensions of the circumferential recesses 48. Thus when the sleeves 41 are assembled on the shaft 39 in end to end relationship spaces 56 are formed between the ends of adjacent blades 50.

Figure 4:
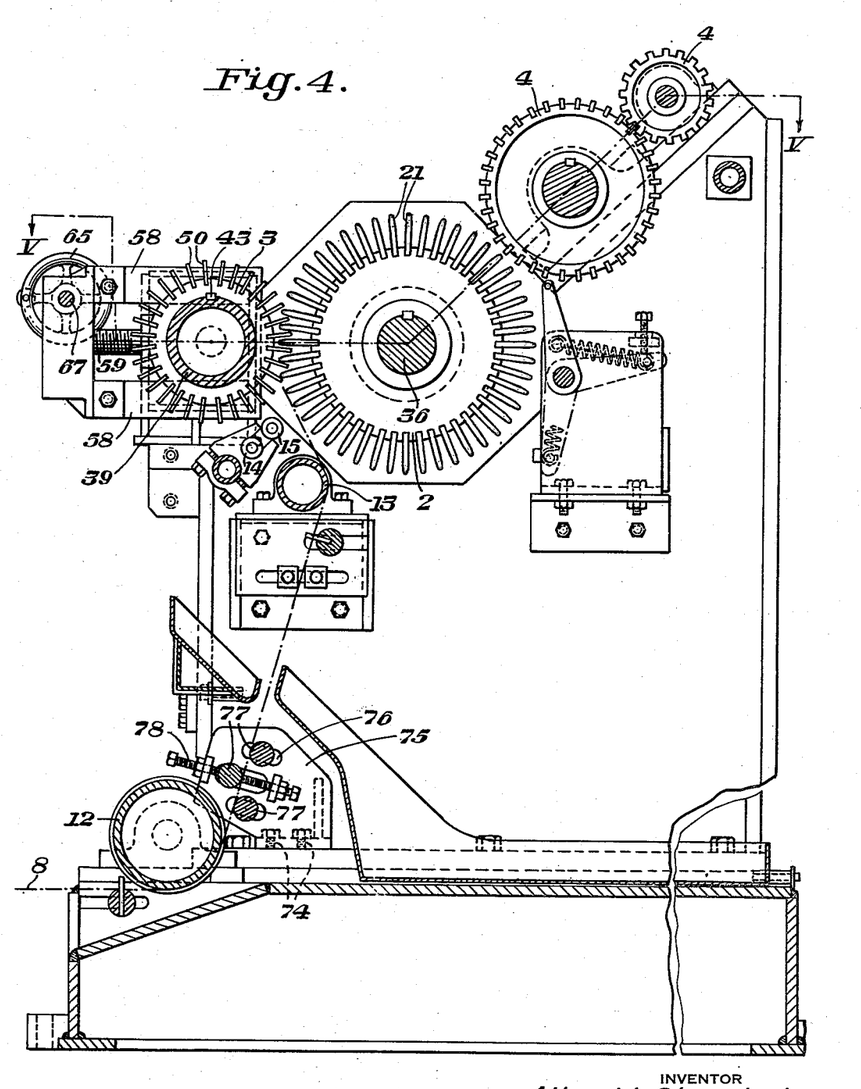
Figure 4 is a fragmentary vertical cross-sectional view to enlarged scale taken on the line IV—IV of Figure 3.
Figure 6:
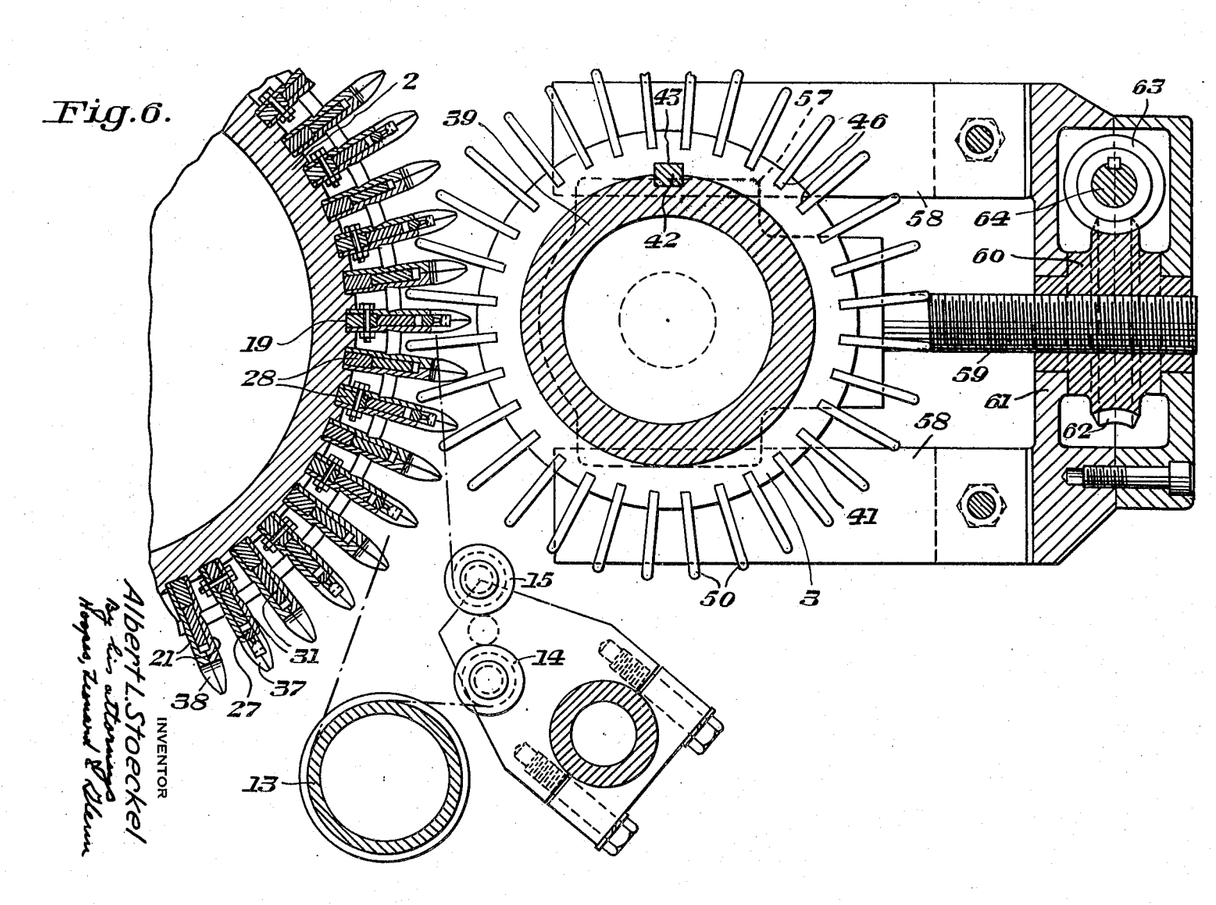
Figure 6 is an enlarged fragmentary vertical cross-sectional view through a portion of the machine taken on the line VI—VI of Figure 2A.
Figure 7:
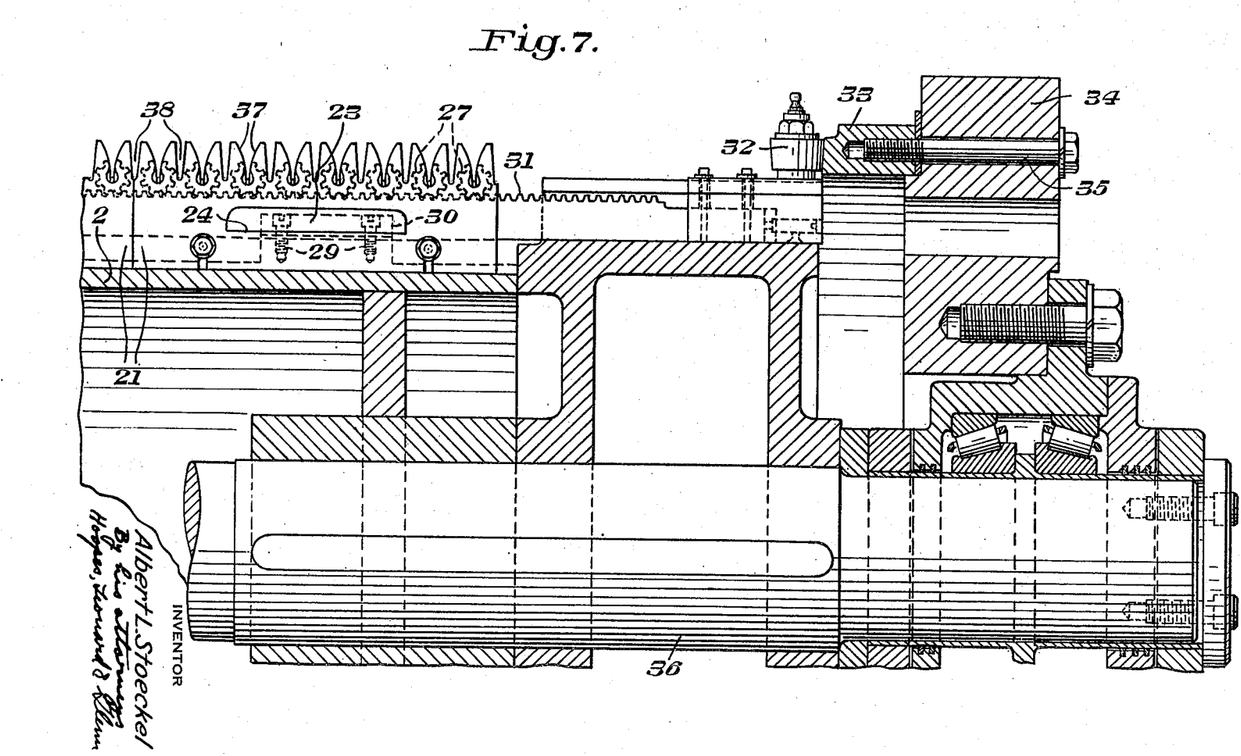
Figure 7 is an enlarged fragmentary cross-sectional view through a portion of the twister drum and twister operating mechanism taken on the line VII—VII of Figure 2A.

The shafts 36 and 40 are driven in opposite directions at such speeds that each blade or longitudinal series of blades 50 moves between adjacent sets of twisters as the machine operates as shown in Figures 4 and 6. The purpose of the blades 50 is to form slack in the wires to provide for twisting of the wires together, the slack being taken up in the twist as the twister drum and feeder wheel turn. The line wires such as selvage wires pass within the slots 56 when they are not to be twisted by an adjacent twister so that no slack is formed therein. Provision may be made for any desired number of line wires by providing the sleeves 41 of proper length, as the length of the sleeves determines the spacing of the slots 56. The blades 50 are removable for replacement by removing the bolts 54. The sleeves 41 are made removable from the shaft 39 by loosening the set screws 44.

The sleeves and blades shown in Figure 5 are slightly different than those shown in Figures 14 to 19, inclusive. While two screws 54 engage each side of each blade 50 in Figure 16 only one screw 54' engages each side of each blade in the form shown in Figure 5, the screw 54' being disposed centrally of the blade.

The feeder wheel 3 is journaled in bearing blocks 57 at the respective ends thereof, each of such bearing blocks being horizontally slidable toward and away from the twister drum 2 in guides 58 carried by the frame. Each bearing block 57 carries a horizontally projecting screw 59 which is fixedly positioned relatively to its bearing block and is threaded into a nut 60 journaled for rotation in the frame at 61. Integral with the nut 60 is a worm wheel 62 which meshes with a worm 63 keyed to a shaft 64. There are two shafts 64, one at each end of the machine. Each shaft 64 carries a hand-wheel 65 for turning the shaft. The two shafts 64 are connected through couplings 66 with a shaft 67 so that turning of either handwheel 65 turns both shafts 64 synchronously. Such turning of the shafts turns the worms 63 carried thereby and those worms which mesh with the worm wheels 62 turn the nuts 60. But since the nuts 60 are journaled in the frame their turning causes the bearings 57 to move along the guides 58 toward or away from the twister drum 2, depending upon the direction of rootation of the shafts 64 and 67. In this way the feeder wheel may be adjusted to desired positions relatively to the twister drum while maintaining predetermined relative orientation between the feeder wheel and the twister drum. The shaft 40 which drives the shaft 39 is connected therewith through a flexible universal joint coupling 68 which provides for adjustment of the feeder wheel as just described. The required amplitude of adjustment is small.

As explained above it is important from the standpoint of uniformity and high quality of the fabric that a predetermined one of the two wires entering each twister move into the twister throat first. The wires enter the twister throat when the twister gear is in the position in which the twister gears 27 are shown in Figure 8, to wit, with its throat which is designated generally by reference numeral 69 open outwardly between the corresponding guides 37. As the machine operates two wires enter the throat 69, one moving downwardly into the throat along each of the opposed guides 37. To provide for the proper wire entering the throat first I utilize wire delaying means which in the structure shown are integral with the twister gears. The throat 69 of each twister gear has a bottom portion 70 of uniform transverse dimension which is less than twice the diameter of the wire being employed and an entrance 71 which flares from the transverse dimension of the bottom portion 70 to much greater tranverse dimension in a direction outwardly of the throat. The throat entrance is formed by inclined surfaces 72 and 73. These surfaces have diflerent inclinations, the surface 73 being steeply inclined while the surface 72 is less steeply inclined. The result is that as the two wires move downwardly into the throat entrance, one being guided adjacent each side of the thorat entrance, the wire which comes in contact with the surface 73 will move relatively rapidly without interruption down into the bottom portion 70 of the throat while the wire which engages the surface 72 will be momentarily delayed and hence will enter the bottom portion 70 of the throat after other wire has entered. By this provision entrance into the throat of each twister gear of a predetermined wire ahead of the other wire is assured. The wires move down in the bottom portion 70 of the throat until they are disposed adjacent the axis of rotation of the twister gear. Since the portion 70 of the throat has a transverse dimension less than twice the diameter of the wire rotation of the twister gear insures twisting of the wires about each other. Such twisting as above explained occurs as the twister drum rotates, the stationary cams 33 causing the racks 31 sequentially to turn the respective series of twisters. After the two wires in each twister have been thus twisted the twister comes to a stop with the throat open outwardly and the twisted wires are ejected from the twister by the first stripping wheel 4. The wire passes about the stripping wheels 4 and is delivered and coiled as above explained.

As indicated above, it is preferable to have a double selvage wire at each edge of the strip of wire fabric. In order that the fabric may be uniform there should be the same number of twists at the selvage on both edges of the fabric. In the case of a 1" hexagonal mesh machine the twisters may make two complete revolutions during each twisting operation. In order that there shall be equal twists at both edges of the fabric the selvage wires must enter the twisters in advance of the mesh wire at one edge of the fabric and the mesh wire must enter the twisters in advance of the selvage wires at the opposite edge of the fabric. To demonstrate the reason for this, let it be assumed that the twisters rotate clockwise looking in the direction of advance of the wire fabric and that two complete twists at each edge are desired. Considering now the selvage wires at the right-hand side of the strip of wire fabric looking in the direction of advance of the wire fabric, if the two selvage wires enter the twisters ahead of the mesh wire the twisting will start immediately upon commencement of turning of the twisters resulting in two complete twists. On the other hand, if the mesh wire enters the twisters ahead of the selvage wires the twisters will make a half revolution before starting the twisting, resulting in only one and one-half twists rather than two twists. Accordingly, on the right-hand side of the machine where it is desired that the two selvage wires enter the twister ahead of the mesh wire, the selvage wires run directly from the pulley 13 to the twister drum.

On the left-hand side of the machine looking in the direction of advance of the wire fabric the opposite condition exists and in order to obtain two full twists the mesh wire should enter the twisters ahead of the two selvage wires. To accomplish this the two selvage wires are directed about the pulleys 14 and 15 which result in directing the selvage wires into the twisters at such an angle that the mesh wire has an opportunity to enter ahead of the selvage wires. If it should be desired to have only one and one-half twists at each edge of the strip of wire fabric the pulleys 14 and 15 would be utilized at the opposite side of the machine; but in any event the pulleys 14 and 15 are utilized for the selvage wires at one side only of the fabric strip and not at both sides at the same time when fabric having the same number of twists at both edges is being made.

It has been mentioned that the capstan wire feeder 12 is driven continuously during operation of the machine as is the twister drum 2. The relative speeds of the capstan and twister drum are regulated so that the capstan tends to deliver the wire to the twister drum slightly faster than the twister drum takes the wire. If the wire were at all times taut on the capstan it would be fed faster than it can be taken by the twister drum. However the feeding of the wire at proper speed to the twister drum is provided for by an overfeed preventer now to be described.

Mounted on the frame by bolts 74 are brackets 75, one adjacent each end of the machine. Each bracket has three elongated slots 76. Round bars 77 are mounted in the respective slots and are adjustable therealong but maintained in desired adjusted positions by means such as set screws 78 as shown applied to the middle bar in Figure 4. The bars 77 are adjusted to engage and exert a slight frictional drag or back tension on the wires. They are positioned close to the capstan 12. Since the bars 77 exert a slight frictional drag or back tension on the wires no slack is formed between the overfeed preventer and the twister drum. When the capstan 12 tends to feed the wires through the bars 77 faster than the wires are drawn forward by the twister drum the overfeed preventer due to its frictional engagement with the wires causes slight backing up thereof around the capstan and sufficient loosening of the wires on the capstan that the capstan turns relatively thereto. As soon as the twister drum draws the wires forward they are tightened about the capstan which again becomes operative to feed them forward. Thus overfeeding of the wires is prevented, resulting in formation of flat uniform fabric of good quality and elimination of tangling of wires in the machine.

Figure 2A:
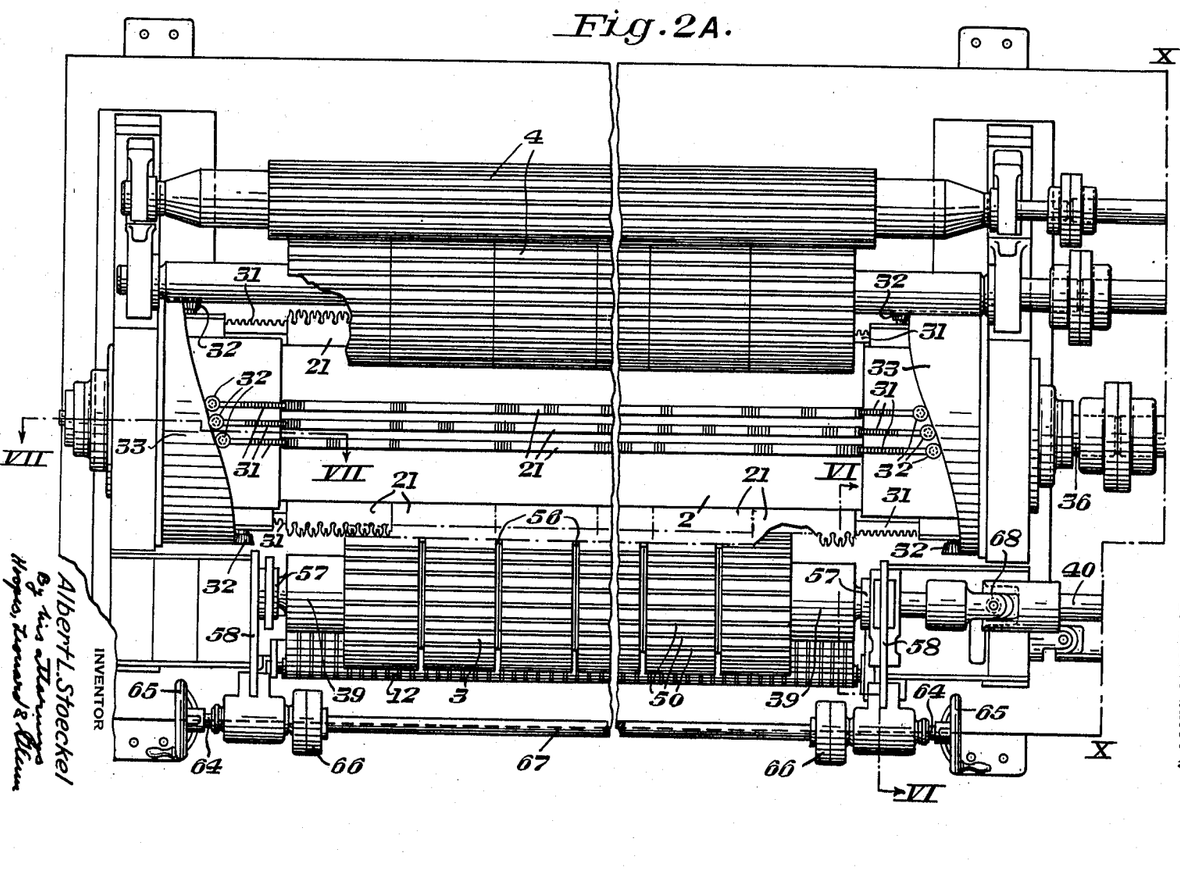
Figures 2A and 2B taken together (joined at the chain line X—X) constitute a fragmentary enlarged diagrammatic plan view of a portion of the machine including the drive therefor.
Figure 2B:
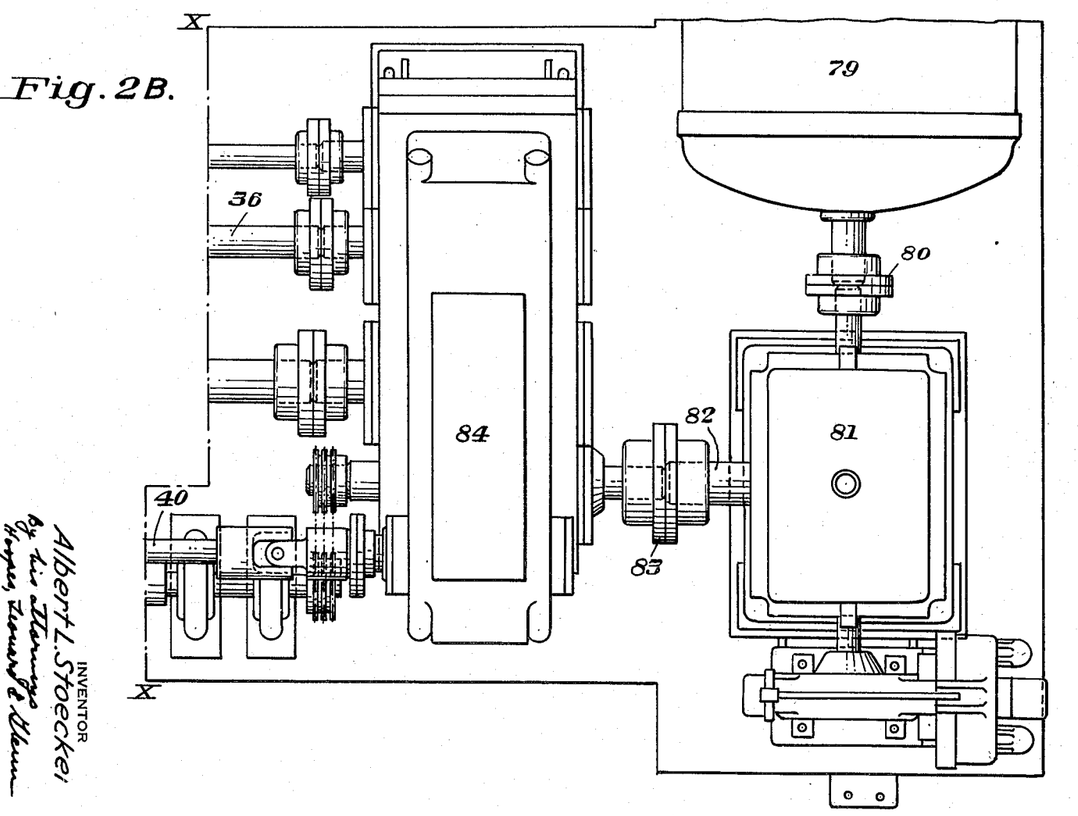
Figure 3:
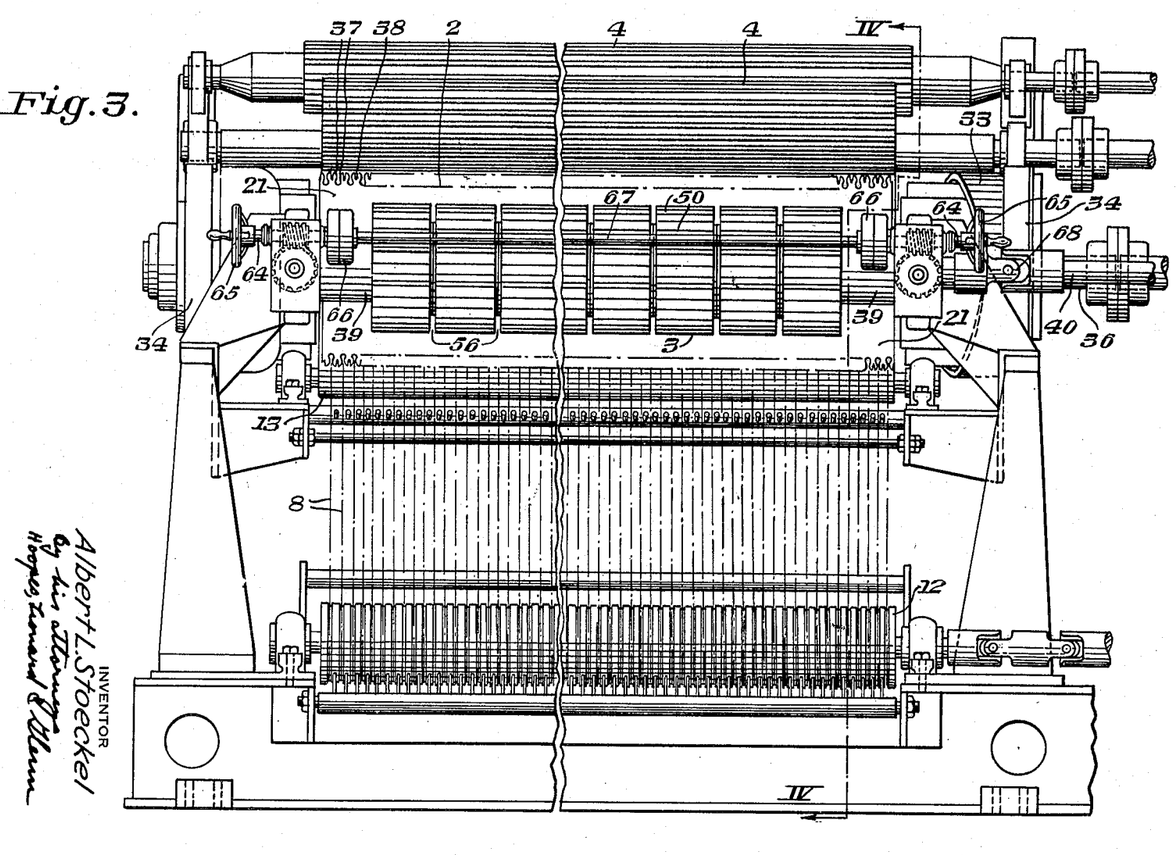
Figure 3 is a fragmentary front elevational view of a portion of the machine.

Figure 2B shows diagrammatically the drive for the machine. The power unit may be an electric motor 79 connected through a coupling 80 with a gear reducer 81. The driven shaft 82 of the gear reducer is connected through a coupling 83 with a train of gears in a gear case 84 through which the elements of the machine are driven. Since I do not claim any novelty in the driving mechanism I have not shown the same in detail. Likewise other portions of the machine in which no novelty is claimed are not shown in detail. I have sufficiently shown and described those portions of the machine in which my invention resides to enable a clear understanding thereof and of the operation of the machine as a whole.

While I have shown and described certain present preferred embodiments of the invention it is to be distinctly understood that the invention is not limited thereto but may be otherwise variously embodied within the scope of the following claims.

I claim:

1. A machine for making wire fabric comprising rotary twisters to which mesh and selvage wires arranged in generally side-by-side relationship are fed to twist wires together and make a strip of wire fabric with selvage edges, the twisters being arranged in a plurality of series with the twisters of each series arranged in generally side-by-side relationship and the respective series generally parallel, mounting means carrying the twisters, means moving the mounting means to advance the series of twisters one after another, means for turning the twisters, each of the twisters having a throat therein, and means at one edge only of a strip of wire fabric being made on the machine disposed at one side of the entrance of a twister throat at that edge in position to engage the selvage wire at that edge prior to its entry into the twister throat deflecting the selvage wire from its normal path whereby to change the angle of entry of the selvage wire into the twister throat and thus provide for entry into the lower part of the twister throat of a line wire ahead of the selvage wire.

2. A machine for making wire fabric comprising rotary twisters to which mesh and selvage wires arranged in generally side-by-side relationship are fed to twist wires together and make a strip of wire fabric with selvage edges, the twisters being arranged in a plurality of series with the twisters of each series arranged in generally side-by-side relationship and the respective series generally parallel, mounting means carrying the twisters, means moving the mounting means to advance the series of twisters one after another, means for turning the twisters, each of the twisters having a throat therein, means at one edge of a strip of wire fabric being made on the machine disposed at one side of the entrance of a twister throat at that edge in position to engage a selvage wire at that edge prior to its entry into the twister throat deflecting the selvage wire from its normal path whereby to change the angle of entry of the selvage wire into the twister throat and thus provide for entry into the lower part of the twister throat of a line wire ahead of the selvage wire and means at the opposite edge of the strip of wire fabric being made on the machine disposed at one side of the entrance of a twister throat at that edge in position to engage a line wire at that edge prior to its entry into the twister throat deflecting the line wire from its normal path whereby to change the angle of entry of the line wire into the twister throat and thus provide for entry into the lower part of the twister throat of a selvage wire ahead of the line wire.

3. A machine for making wire fabric comprising rotary twisters to which mesh and selvage wires arranged in generally side-by-side relationship are fed to twist wires together and make a strip of wire fabric with selvage edges, the twisters being arranged in a plurality of series with the twisters of each series arranged in generally side-by-side relationship and the respective series generally parallel, mounting means carrying the twisters, means moving the mounting means to advance the series of twisters one after another, means for turning the twisters, each of the twisters having a throat therein, means for positioning two wires adjacent each twister throat with the wires extending generally parallel to the twister axis, means for guiding the wires into the twister throats as the series of twisters advance one after another so that the wires enter the twister throats in a direction transversely of the wires, the guide means guiding the wires into each twister throat respectively at opposite sides of the twister throat, and means adjacent each twister positioned at one side of the entrance of the twister throat so as to be in the path of one of the wires as it is guided into the twister throat by the guide means to engage that wire and momentarily delay movement thereof into the twister throat so that the other wire precedes it into the lower part of the twister throat.

4. A machine for making wire fabric comprising rotary twisters to which mesh and selvage wires arranged in generally side-by-side relationship are fed to twist wires together and make a strip of wire fabric with selvage edges, the twisters being arranged in a plurality of series with the twisters of each series arranged in generally side-by-side relationship and the respective series generally parallel, mounting means carrying the twisters, means moving the mounting means to advance the series of twisters one after another, means for turning the twisters, each of the twisters having a throat therein, means for positioning two wires adjacent each twister throat with the wires extending generally parallel to the twister axis, means for guiding the wires into the twister throats as the series of twisters advance one after another so that the wires enter the twister throats in a direction transversely of the wires, the guide means guiding the wires into each twister throat respectively at opposite sides of the twister throat, and means adjacent each twister positioned at one side of the entrance of the twister throat so as to lie in the path of one of the wires as it is guided into the twister throat by the guide means to engage that wire and momentarily delay movement thereof into the twister throat so that the other wire precedes it into the lower part of the twister throat, said last mentioned means at one edge of the strip of wire fabric engaging and momentarily delaying movement of a selvage wire into the twister throat so that a line wire precedes it into the lower part of the twister throat and said last mentioned means at the opposite edge of the strip of wire fabric engaging and momentarily delaying movement of a line wire into the twister throat so that a selvage wire precedes it into the lower part of the twister throat.

References Cited in the file of this patent

UNITED STATES PATENTS

| Number | Name | Date |
|---|---|---|
| 383,785 | Vandegrift | May 29, 1888 |
| 413,666 | Hill | Oct. 29, 1889 |
| 640,772 | Kauffman | Jan. 9, 1900 |
| 954,205 | Randall | Apr. 5, 1910 |
| 1,456,127 | Gerrard | May 22, 1923 |
| 1,821,389 | McChesney | Sept. 1, 1931 |
| 1,936,931 | Bradley | Nov. 28, 1933 |
| 2,053,221 | Kitselman | Sept. 1, 1936 |
| 2,060,418 | Holmquist | Nov. 10, 1936 |
| 2,188,358 | Kilmer | Jan. 30, 1940 |
| 2,492,228 | Lee | Dec. 27, 1949 |